United States Patent [19]

Wiggs et al.

[11] Patent Number: 5,269,058
[45] Date of Patent: Dec. 14, 1993

[54] DESIGN AND PROCESSING METHOD FOR MANUFACTURING HOLLOW AIRFOILS

[75] Inventors: Gene E. Wiggs, West Chester; Kurt L. Hansen; John R. Kelley, both of Cincinnati, all of Ohio

[73] Assignee: General Electric Company, Cincinnati, Ohio

[21] Appl. No.: 991,616

[22] Filed: Dec. 16, 1992

[51] Int. Cl.⁵ .......................................... B23P 15/00
[52] U.S. Cl. ................................ 29/889.72; 29/889.7; 29/463; 416/241 R; 416/232; 416/233; 228/157
[58] Field of Search .................... 416/241 R, 232, 233; 29/889.7, 889.72, 889.721, 463; 228/157, 193, 236, 237

[56] References Cited

U.S. PATENT DOCUMENTS

| | | | |
|---|---|---|---|
| 3,736,638 | 6/1973 | Stone, Jr. | 29/889.72 |
| 4,089,456 | 5/1978 | Toppen et al. | 29/889.72 |
| 4,882,823 | 11/1989 | Wusut et al. | 29/889.72 |
| 5,063,662 | 11/1991 | Porter et al. | 29/889.72 |
| 5,072,871 | 12/1991 | Moracz et al. | 228/193 |
| 5,083,371 | 1/1992 | Leibfried et al. | 29/889.7 |
| 5,099,573 | 3/1992 | Krauss | 416/233 |
| 5,156,327 | 10/1992 | Takahashi et al. | 29/889.72 |

Primary Examiner—Irene Cuda
Attorney, Agent, or Firm—Carmen Santa Maria; Jerome C. Squillaro

[57] ABSTRACT

A method for forming a hollow, internally-ribbed airfoil having a complex geometry. The process forms airfoil halves from alloy members in essentially final machined form. The airfoil halves optionally include a gasket around their periphery and optionally, a gasket around the internal sequence of ribs and cavities. Because the airfoil halves are in final form before joining, important interior airfoil dimensions such as skin thickness, cavity size, rib location and gasket location as well as exterior dimensions such as camber and twist may be verified prior to joining. The airfoil halves are then joined by welding, thereby sealing their interiors and diffusion bonding at relatively low pressures. The gaskets eliminate the use of high pressures and associated skin buckling and permit a concentration of the loads at key locations despite the low pressures. After diffusion bonding, any voids are removed by hot isostatically pressing the airfoil in the superplastic temperature range of the alloy.

22 Claims, 6 Drawing Sheets

DESIGN AND PROCESSING METHOD FOR MANUFACTURING HOLLOW AIRFOILS

BACKGROUND OF THE INVENTION

1. Field of the Invention

This invention relates to hollow structures and, more particularly, to the manufacture of airfoils for producing a lightweight, high-strength hollow airfoil.

2. Description of the Prior Art

Hollow airfoils are utilized by gas turbine engine manufacturers to reduce the weight of the engine. Weight reduction becomes vitally important as the gas turbine engine thrust is increased. One of the ways that thrust is increased is by increasing engine size. As the engine size increases, individual part size and part weight also can increase. In the past, weight reduction has been accomplished by developing strong, light weight alloys. For airfoils such as compressor blades, which typically are solid for smaller engines, the increase in size by design precludes the use of solid airfoils because of the substantial weight gain, since the stresses on the disk caused by the rotating airfoils are unacceptably increased, even when light weight materials such as titanium alloys are used. In order to produce useful but light compressor blades without incurring unacceptable weight penalties, it is necessary to either manufacture composite blades or, in the alternative, hollow metallic blades.

Titanium alloy parts such as compressor blades frequently are formed by taking advantage of the superplastic forming and diffusion bonding behavior of certain metals. Superplastic forming is a technique that relies on the capability of certain metals, such as titanium alloys, to develop high tensile-elongation with a minimal tendency toward local necking when submitted to coordinated time-temperature-strain conditions within a limited range. Superplastic forming is useful in producing a wide variety of strong, lightweight articles.

Many of the same materials used in superplastic forming also can be diffusion bonded. Diffusion bonding is a process which forms a metallurgical bond between similar parts which are pressed together at an elevated temperature and pressure for a specific length of time. Bonding occurs by the diffusion of atoms across adjacent faces of the parts at elevated temperatures. Diffusion bonding provides substantial joint strength with little or no geometric distortion while substantially maintaining the physical and metallurgical properties of the bonded metal.

It has long been desirable to fabricate various aircraft components and turbomachinery components, such as door panels, wing flaps, blades and vanes, as hollow bodies. See, for example, U.S. Pat. Nos. 5,075,966; 4,364,160; 3,825,984; 3,383,093 and 3,220,697. See also U.S. Pat. No. 3,466,166 for hollow articles generally. The benefits of such hollow articles include a substantial reduction in weight which provides improved fuel efficiency and increased thrust-to-weight ratio. Despite the increasing popularity in applying diffusion bonding and superplastic forming techniques for manufacturing aircraft components, there are many critical problems to overcome in order to devise a process for successful manufacturing of hollow airfoils.

Parts formed using diffusion bonding and superplastic forming techniques can have very complex geometries, can exhibit highly nonlinear material behavior and are subject to large irreversible strains. Thus, there exists a possibility of many deformation-induced instabilities, such as necking, grooving, buckling and shear localization, which substantially weaken the structural integrity of the part.

The stringent requirements for both the external aerodynamic shape and internal structure of hollow airfoils present another problem in the manufacture of such parts. In order to produce the desired final shape and thickness, the in-process shape (i.e., the shape and size of the part prior to superplastic deformation) must be known.

Current processes utilize superplastic forming and diffusion bonding to form hollow articles such as compressor airfoils. One such process is described in U.S. Pat. No. 3,628,226. The process comprises grooving flat blanks and forming the grooved blank into a preliminary airfoil surface without longitudinal curvature. Next the blanks are machined flat on the inner surface. The blanks are then diffusion bonded to form a rough airfoil. The rough airfoil is then twisted to form a final airfoil. The infirmity with this process is that the twisting operation, which occurs after the diffusion bonding operation, may not produce a part having the desired final internal shape or skin thickness. The twisting operation itself, performed at the elevated temperatures associated with superplastic forming, may produce unacceptable necking, locally reducing part thickness below the minimum value required. To achieve the necessary final shape, additional machining may be required, and this machining may reduce the hollow part thickness below the minimum allowable thickness, resulting in a high scrap rate and accompanying higher costs.

Another method is described in U.S. Pat. No. 5,063,622. By use of this method, a shroudless blade which is also hollow is produced. This process requires the forming of a hollow, untwisted blade of lenticular cross-section with axially-extending ribs connecting opposite walls of the blade. The blank for each half of the blade is formed to establish the lenticular cross-section shape. After the blade is formed with the curvature in the cross-sectional direction, the concave side is cut flat and grooves are machined therein leaving lands which will form the blade ribs. The blade halves are bonded together. The untreated blade is then creep-deformed. Then, superplastic forming is used to establish the final form of the blade. The hourglass shape of the ribs with this minimum cross section at the diffusion bond plane results in the highest compressive stresses at the ribs. A substantial problem of skin buckling exists due to the combination of minimum cross-section and high compressive stresses. Furthermore, because the stresses are high in the rib region, the stresses in the surrounding leading and trailing edge regions are low, leading to a higher probability of disbonds in these regions.

Still, this method represents an improvement, but requires the use of dies for hard die pressing. These dies are subject to wear and require frequent refurbishment or replacement. The die pressing operation can thus be subject to extensive out-of-tolerance conditions. These out-of-tolerance conditions, even when small, can result in the failure of the land areas to match up in the diffusion bonding step, which can lead to inadequate diffusion bonding and premature failure, or if timely detected, scrappage of the part. Furthermore, forming may result in local buckling due to the widely varying metal thicknesses. Also contributing to scrappage are the machining operations in step 5 of U.S. Pat. No. 5,063,622, which can lead to scrappage after diffusion bonding if the minimum thickness is not maintained. Alternatively, to assure against such a problem, additional material can be accommodated into the blade to assure that sufficient stock is present. Of course, this is undesirable since additional weight unnecessarily may be added to the parts, if insufficient metal is removed, or conversely, the part may be too thin to meet design requirements if too much metal is removed. Finally, it must be recognized that the configuration of the blades at this point in the manufacturing sequence makes accurate measurement and control of blade wall (skin) thickness very difficult, so that existing inspection techniques may not detect out-of-tolerance conditions.

Therefore, it is an object of the present invention to provide a method for manufacturing by superplastic forming and diffusion bonding, hollow airfoils having aerodynamic shapes and very complex geometries to the final desired shape and thickness without compromising the physical and metallurgical properties of the bonded metal by achieving the necessary diffusion bond in the skin region while alleviating problems of (skin or rib) buckling.

SUMMARY OF THE INVENTION

The airfoil forming method of the present invention provides a substantially defect-free internally-ribbed, high strength hollow airfoil having a complex geometry. Unlike prior art processes, the airfoil is manufactured in two halves by fully forming each half to substantially final shape prior to diffusion bonding. Inspection operations are readily performed on each half, which is essentially formed to its final twist and camber before any diffusion bonding. The skin thickness is readily inspected on each half. Such inspection operations are not readily performed or may not even be possible after bonding of the airfoil. The in-process inspection operations at this stage of the manufacture of the airfoil is critical in achieving a finished airfoil having the desired final shape and thickness.

The method of manufacturing each hollow airfoil of the present invention comprises providing a pair of alloy members having a controlled grain size. The alloy must be readily diffusion bondable and must be capable of superplasticity at elevated temperatures. Typical suitable alloys include titanium-based alloys. The alloy members are then hot formed into a convex member and a concave member, each having an interior side and an exterior side as well as a camber and twist.

After forming, the exterior side of both the convex member and the concave member are machined to near final twist and camber. Forming is accomplished by near net shape forging or hot forming of plate material. The convex member and the concave member are machined to be mating halves of a complexly shaped airfoil blank. The interior side of each airfoil half is also machined to form a plurality of cavities and ribs, the cavities and ribs of the convex and concave airfoil halves are dimensioned so as to be opposed upon assembly together of the airfoil halves such that the ribs will touch, while the cavities of the mating halves, when joined, will form larger cavities. At this point in the manufacturing sequence, key airfoil features are established in essentially final form and are readily accessible for inspection to assure correct dimensions. Important interior dimensions such as cavity dimensions and wall thickness, as well as exterior dimensions such as twist and camber, can be measured prior to bonding the airfoil halves.

A gasket may then be machined around the outer perimeter of one of the airfoil halves. Although this gasket is not required to be extensive, it must extend completely around the outer perimeter. This gasket permits the airfoil halves to be effectively diffusion-bonded together. The gasket permits a better bond in the skin region adjacent to the leading and trailing edges, and solves a problem of poor bonding in the skin region frequently encountered in the prior art.

After cleaning, the twisted and cambered airfoil halves are assembled together so that the interior side of the convex side and the interior side of the concave side form an intermediate structure having a plurality of opposed ribs in contact with each other. The cavities are also opposed, defining a plurality of intermediate cavity shapes. The assembled airfoils are next welded together around their periphery. A vacuum is then pulled on the cavities forming the interior of the airfoil. This vacuum is sufficiently strong to evacuate the interior without causing the cavities to collapse. While this vacuum is maintained, the periphery of the blade is sealed thereby isolating the interior of the airfoil from the exterior.

The airfoil halves are then diffusion bonded. This is accomplished by placing the welded airfoil halves in a furnace. Then, by raising the temperature of the furnace to a preselected temperature and maintaining a preselected pressure for a preselected time, the airfoil halves are diffusion bonded together. The temperature, time and pressure will vary from one selected alloy to the next. During the diffusion bonding process, the cavities may partially collapse.

After diffusion bonding is accomplished to form an airfoil blank, the cavity of the airfoil blank is unsealed, and the blank is hot isostatically pressed by raising the temperature and pressure to a second temperature and pressure higher than that used for diffusion bonding for a second preselected time. This temperature may be within the superplastic temperature range for the material, although a temperature in this range is not required. This hot isostatic pressing removes any internal voids present in the airfoil blank after diffusion bonding and assures the formation of a high strength bond.

If the airfoil blank is not at a temperature within the superplastic temperature range of the material, the temperature of the blank is raised to at least such a temperature. Next, an inflation tube is attached to the cavities and the interior is repressurized, while still at a temperature within the superplastic forming temperature of the material, with an inert gas to reinflate any collapsed cavities. Next the internal pressure of the airfoil blank is equalized with the external pressure.

Because the airfoil is already in its final camber and twist, the remaining operation is simply to machine away the airfoil blank periphery to obtain the finished airfoil.

Other features and advantages will be apparent from the following more detailed description of the invention, taken in conjunction with the accompanying drawings, which will illustrate, by way of example, the principles of the invention.

DESCRIPTION OF THE PREFERRED EMBODIMENTS

Figure 1:
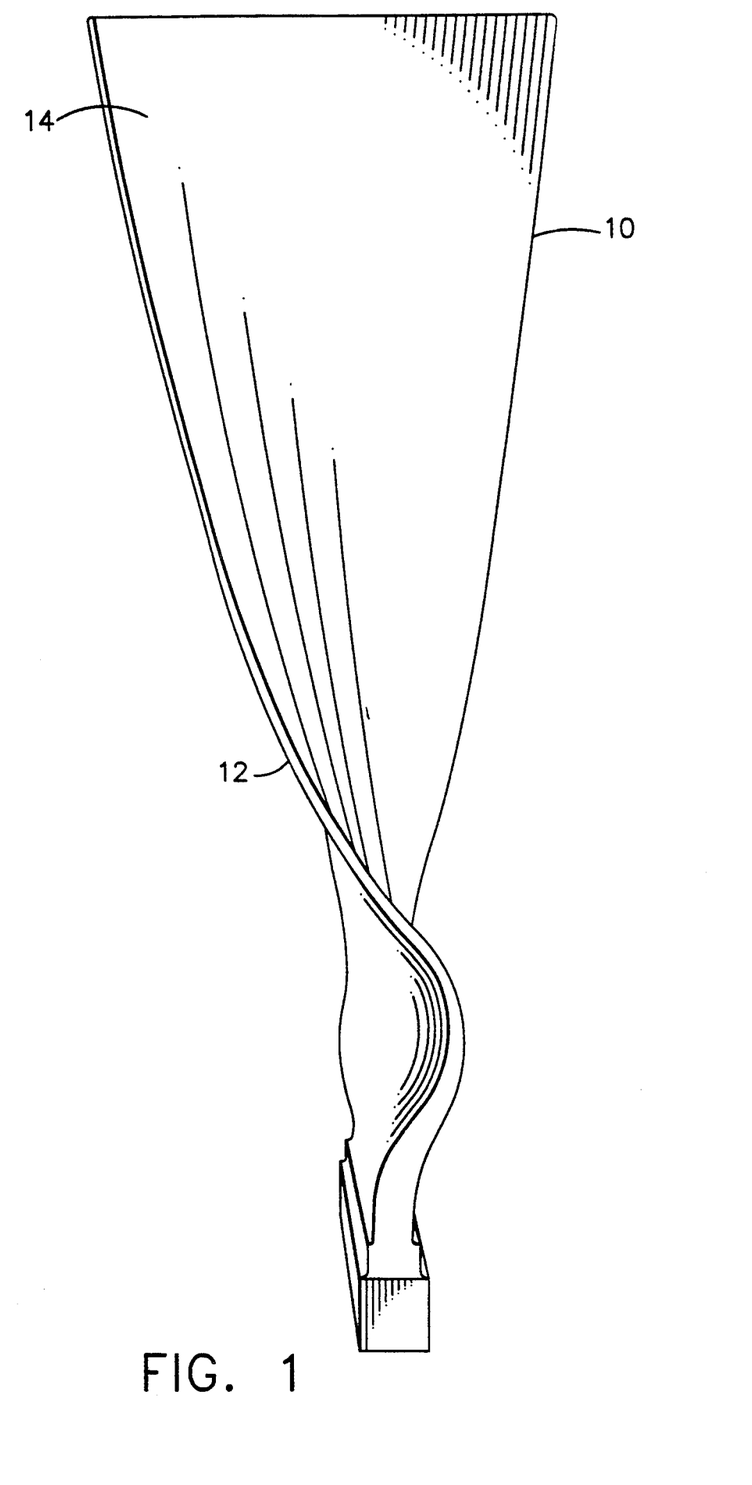
FIG. 1 is a perspective view of an airfoil made in accordance with the present invention.

A complexly-shaped, high strength hollow airfoil 10 made in accordance with the present invention is shown in FIG. 1. The airfoil includes a convex airfoil half 12 and a concave airfoil half 14.

Figure 2:
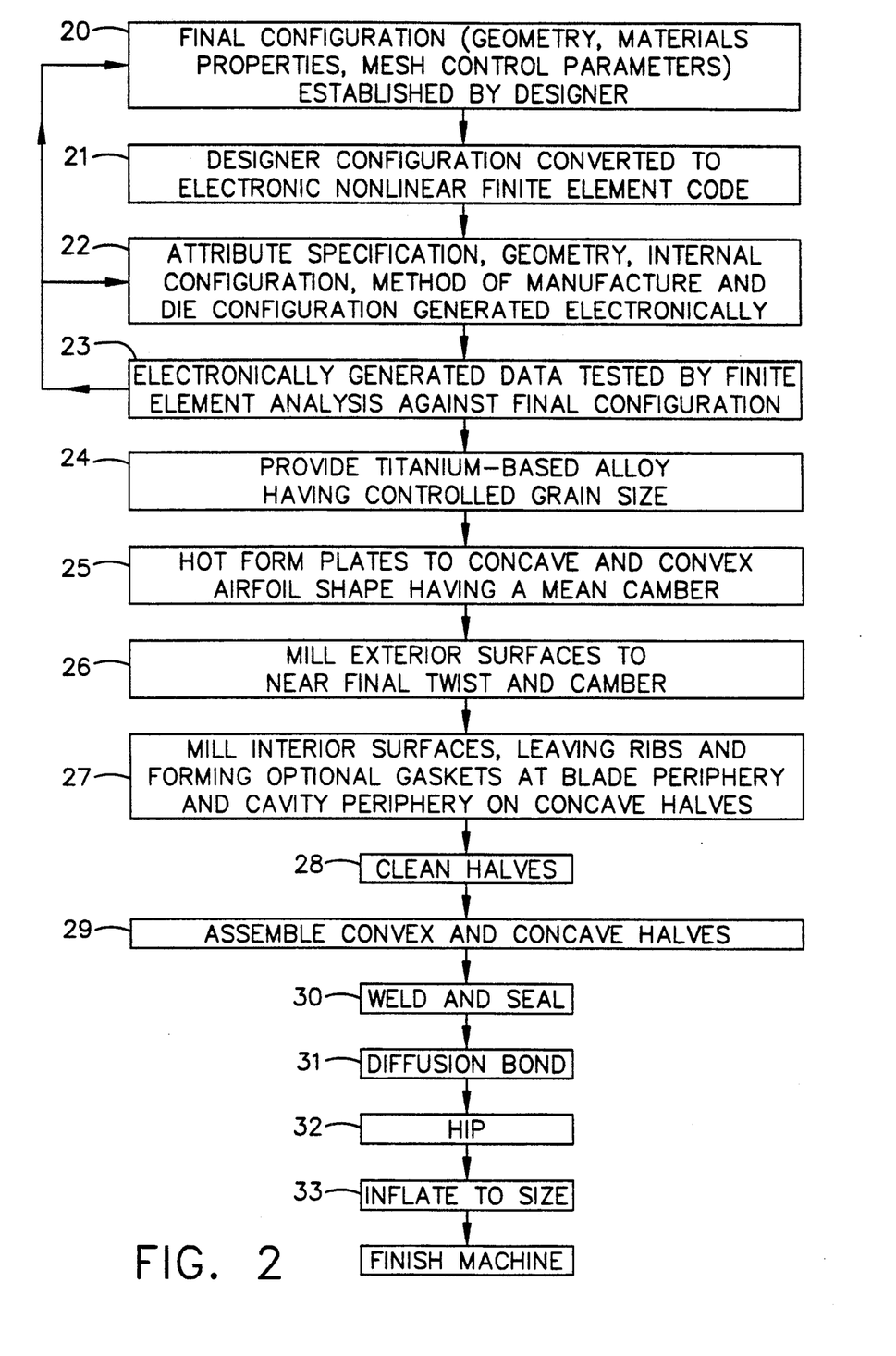
FIG. 2 is a Block Diagram of the airfoil manufacturing method.

FIG. 2 is a flowchart illustrating the steps of the method of the present invention. The engine design typically dictates the airfoil needs. From the engine design, the designer can establish the final design configuration of the airfoils. This is represented by Block 20. This final configuration establishes the essential engineering data, such as the overall part geometry, the required materials properties and the in-process stock allowances.

As indicated in Block 21, the designer configuration is converted to a form readable by an electronic nonlinear finite element code. Then, the attribute specification, part geometry, internal configuration (for non-solid parts), method of manufacture (including times, temperatures and pressures, for example) and die configuration are generated electronically as shown in Block 22. This electronically generated data is tested by a finite element analysis program against the final configuration to determine if the final design configuration established by the designer can be manufactured while still meeting engineering requirements, as indicated in Block 23. If not, a new set of attribute specifications as set forth is Block 22 is generated and retested. This iteration is continued until an in-process design meeting the final design configuration is generated. If the final design configuration cannot be manufactured, then the designer is contacted so that a new final design configuration can be determined and tested as above.

Once the data of Block 23 has been successfully electronically tested, indicating that an airfoil having the required geometry and having the specified material properties can be made by the specified method of manufacture with the specified die configuration while still satisfying all engineering requirements, manufacture of the airfoil can begin. Although the geometry will vary from one airfoil design to the next, the basic steps are displayed in FIG. 2. As shown in FIG. 2, Block 24, an alloy, usually in plate form and having a controlled grain size is provided. For fan and compressor airfoils, titanium-base materials are preferred.

These plates are then hot formed in air at about 1600° F. for about one hour for Ti-6Al-4V (titanium alloy having a nominal composition of 6% aluminum and 4% vanadium by weight, balance titanium and incidental impurities) alloy or titanium Alloy 550 (titanium alloy having a nominal composition in weight percent of 4% aluminum, 2% tin, 4% molybdenum, 0.5% silicon and the balance titanium and incidental impurities) to achieve the desired configuration. It will be recognized by those skilled in the art that these temperatures and times may be varied significantly (by more than 100° F.), with longer times required for lower temperatures and correspondingly shorter times for somewhat higher temperatures, to achieve the desired configuration for Ti-6Al-4V alloy and Alloy 550, while different temperatures and times are required for different alloys. For each final airfoil, a pair of formed plates is required, although a pair of matching near net shape forgings may also be utilized. One plate is formed into a concave airfoil shape having a mean camber, and the other plate is formed into a matching convex airfoil shape having a corresponding mean camber, as illustrated in Block 25.

The convex and concave shapes are then machined. First the exterior surfaces of each part are machined, preferably by precision milling, to final twist and camber as represented by Block 26. Next, the interior surfaces are machined, again preferably by milling. At this stage, represented by Block 27, the internal cavities and ribs are machined. This represents a distinct departure from the prior art. All prior art processes have deferred the twisting and cambering operations until after the airfoil halves are diffusion bonded. The designs are typically so complex that final twisting and cambering is required to be deferred until after diffusion bonding because the proper matching of the twisted and cambered, convex and concave halves for diffusion bonding is exceedingly difficult. Prior to the methods of the present invention, higher yields were possible by machining internal cavities before diffusion bonding, while and twisting and cambering was (and is) performed after diffusion bonding since the geometries for bonding flat, plate-like halves are substantially easier to match than the near final machined, twisted and cambered parts of the present invention.

The method of the present invention diverges from the prior art in another manner. The present invention involves machining the airfoil halves to near final configuration. Only minimal machining is subsequently required. Unlike prior art processes which leave substantial excess material on the plate halves prior to diffusion bonding so that machining stock is available for cleanup after twisting and cambering, the present invention essentially performs all final machining prior to diffusion bonding. The precise computer-generated processing and in-process tolerancing assures that the final machined, twisted and cambered airfoil halves will match up for diffusion bonding. This method provides the clear advantage of enabling inspection and determination of critical dimensions such as airfoil wall thickness before the halves are diffusion bonded together. Prior art processes requiring removal of material after final twisting and cambering suffer from the infirmity of not being able to accurately determine wall thickness after material removal once diffusion bonding, cambering and twisting is performed. In such methods, to preclude the prospect of an undersize wall thickness, excess material stock is designed into the airfoil configuration, and this excess stock represents undesirable added weight to the engine structure.

Figure 3:
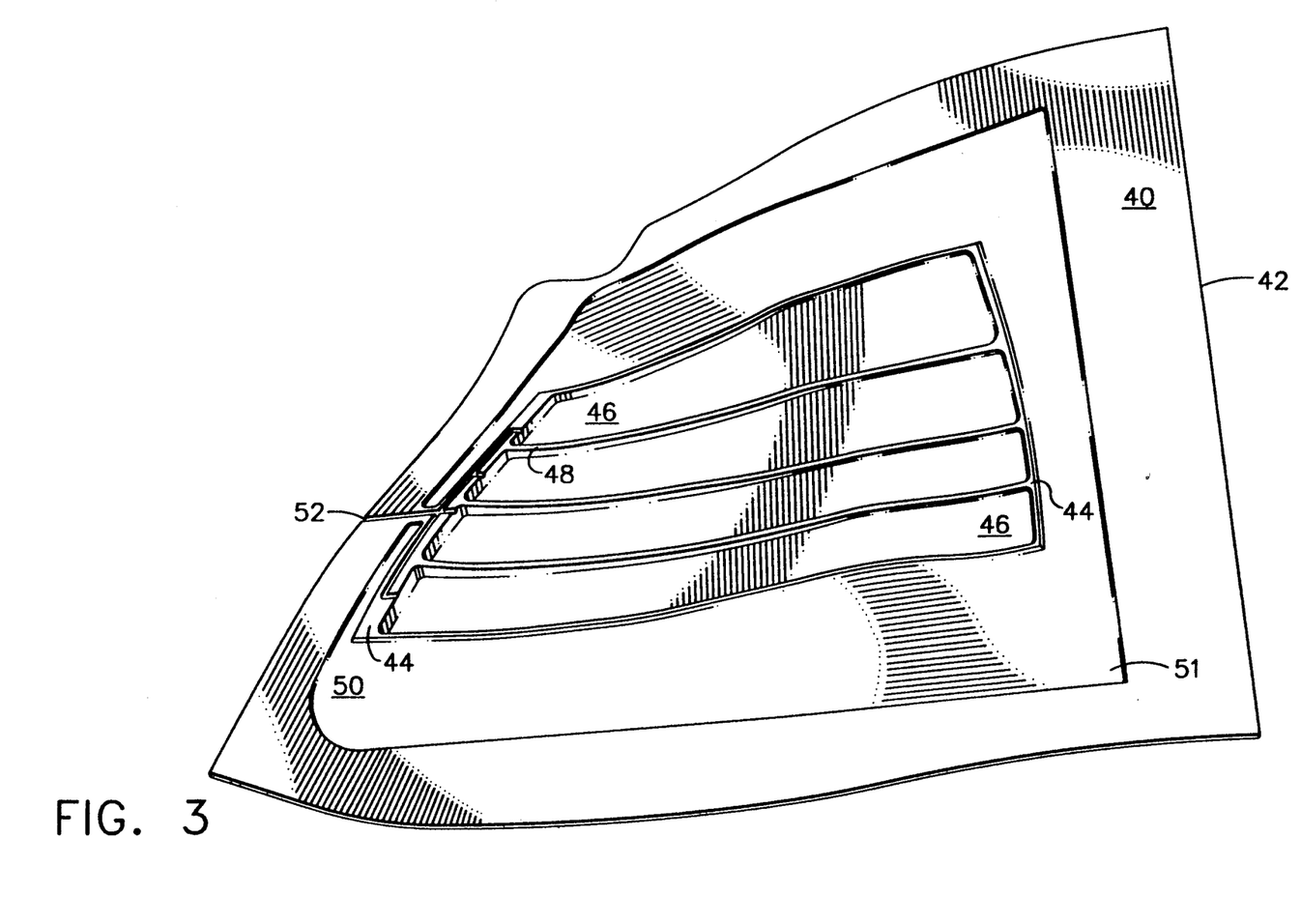
FIG. 3 is a top view of the interior of a concave half of an airfoil made in accordance with the present invention.

Referring now to FIG. 3, in order to enhance diffusion bonding in the assembled halves, a first gasket 40, as noted in Block 27 of FIG. 2, is machined around the airfoil perimeter 42 of at least one of the airfoil halves. A second gasket 44 is machined around the plurality of cavities 46 of at least one of the halves and is distinguishable from the ribs 48. The gasket or gaskets are preferably machined into the concave airfoil half 14, although such gaskets may be machined into both halves. Although not required for the proper operation of the present invention, the gasket or gaskets enhance ability to perform diffusion bonding. The resulting internal airfoil configuration thus includes a slight depression 50 in the skin region 51 between the first or perimeter gasket 40 and the second gasket 44. Each airfoil half also contains a precision machined locating feature (not shown) to assure that the mating airfoil halves can be properly assembled together, as is well known in the art. These features may be precision-located holes in each half through which pins may be inserted. Alternatively, one airfoil half may contain a pin and the mating half may contain a precision-located hole. Any other suitable locating features may be used to assure proper assembly.

Figure 4:
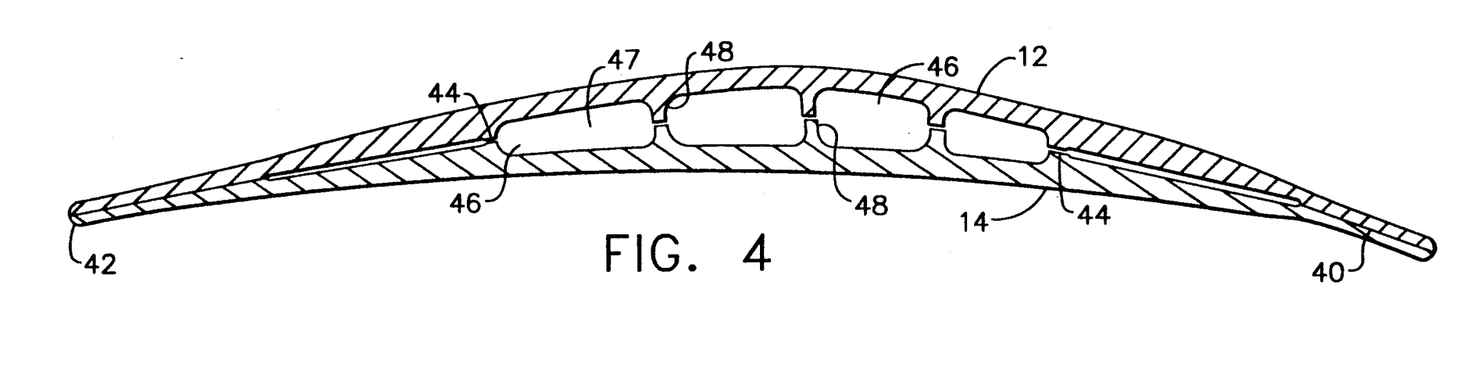
FIG. 4 is a side view, in section, of the assembled convex airfoil half and the concave airfoil half, forming an unbonded blank, prior to diffusion bonding.

Each machined airfoil half is cleaned in preparation for the diffusion bonding operation as set forth in Block 28 of FIG. 2. The convex half and the concave half are assembled together. FIG. 2, Block 29 and FIG. 4 depicts the assembly of airfoil halves together. Both the convex half 12 and the concave half 14 in the embodiment of FIG. 4 include a first or perimeter gasket 40 and a second gasket 44. Upon assembly, the ribs 48 of each airfoil half 12, 14, mate with the ribs of the opposing half, while the cavities 46 of each airfoil are opposed, forming a plurality of larger cavities 47, as depicted. The gaskets associated with each half also mate with the gaskets of the opposing half. However, as will become apparent, when gaskets are utilized, it is necessary that only one airfoil half be configured with a gasket to obtain the advantage of improved diffusion bonding.

After assembly, the airfoil halves are welded together around the periphery, as described in FIG. 2, Block 30. Any low distortion welding method may be used to accomplish this step. Welding serves to hold the halves together during subsequent processing and substantially seals the interior of the assembled halves from the exterior atmosphere. Preferred methods include electron beam (EB) welding or a low heat-input tungsten-inert gas method (TIG). A low heat input method is critical at this stage since the parts are already substantially in their final machined configuration. Any welding method which imparts sufficient heat to cause excessive distortion is unacceptable.

The assembled and welded airfoil halves have an interior which form a plurality of cavities 47 in a sequence, the cavities being in fluid flow communication with each other. Referring again to FIG. 3, a channel 52 is in fluid flow communication with the airfoil cavities 47 of the assembled airfoil halves. A hard vacuum is pulled on the internal cavities through this channel 52. The cavities 47 are then backfilled with helium and then reevacuated to a pressure of less than $10^{-2}$ torr, and preferably $10^{-3}$ to $10^{-5}$ torr. The partial pressure is not so high as to cause the cavities to deform at this stage. Channel 52 is then sealed.

Figure 5:
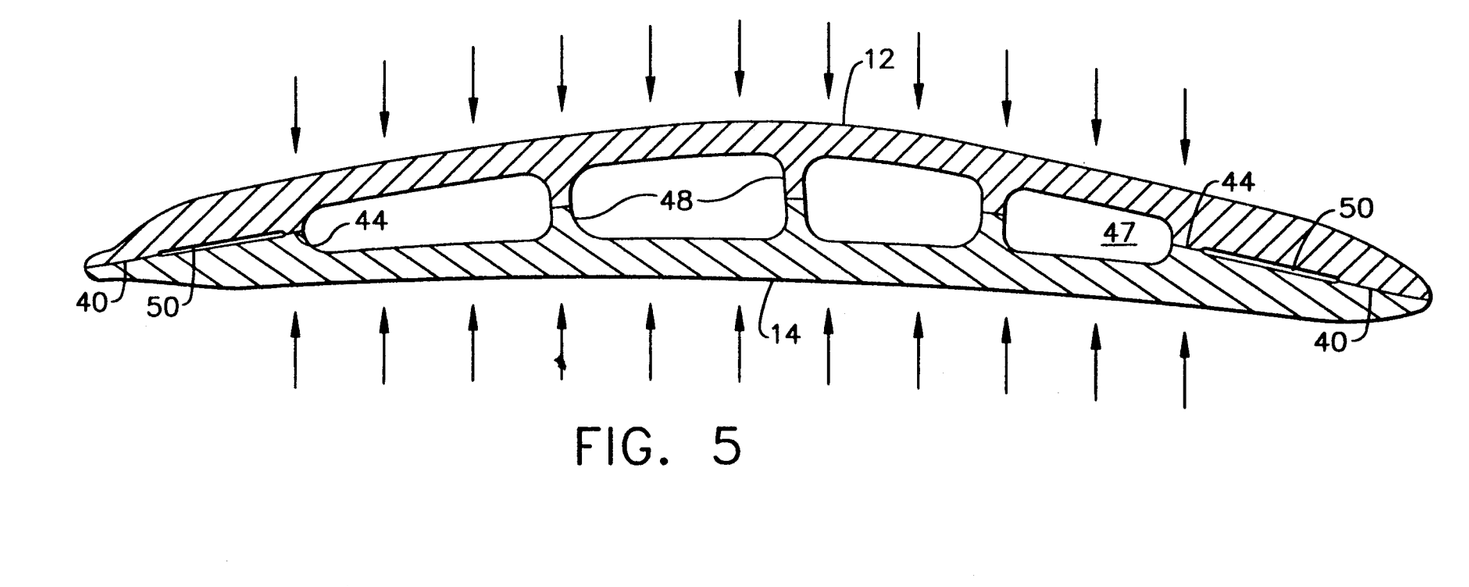
FIG. 5 is a side view, in section, of the assembled airfoil halves of FIG. 4 at the initiation of diffusion bonding.

The sealed Ti-6Al-4V or Alloy 550 airfoil halves are diffusion bonded by being placed in a furnace at a minimum temperature of 1675° F., and preferably between 1700°-1725° F., as set forth in FIG. 2, Block 31. As previously discussed, one skilled in the art will recognize that this temperature will vary depending upon the alloy being utilized, but must be sufficient to allow diffusion bonding of the alloy to occur. A gas, preferably an inert gas such as argon, is supplied at a pressure of at least 15 psia, and preferably in the range of 15-50 psia. Referring now to FIG. 5, which represents the sealed airfoil halves just after insertion into the heated, pressurized atmosphere for diffusion bonding, the arrows represent the pressure applied uniformly to the airfoil halves by the gas. Although the bond pressure from the gas is low, the pressure is transmitted so as to concentrate stress at the ribs and gaskets, the gaskets serving to more uniformly distribute the stress, promote bonding and reduce buckling. The result is load amplification at the gaskets 40, 44 and ribs 48. Additionally, stress is also concentrated at the first or perimeter gasket 40 and at the second gasket 44. This represents an improvement over the prior art processes which lacked such gaskets. Because the prior art lacks such gaskets, the load in the cavity regions is concentrated at the ribs and the remaining load is uniformly distributed over the entire region from the cavity to the periphery of airfoil blank, referred to generally as the leading and trailing edge regions of the airfoil. The prior art solves the problem of poor bonding in the leading and trailing edge regions by raising the pressure of the gas during bonding. However, this approach causes other problems, such as buckling of the ribs and distortion of the airfoils due to the pressure, both of which are unacceptable conditions in airfoil halves which are in near-final form. However, in the present invention, the gaskets provide improved bonding in the outer regions at moderate gas pressures because of the higher stress concentrations due to presence of the gaskets. The stresses are concentrated in high stress gasket regions designed to accept these high loads. Overstressing of these regions as well as overstressing of the rib regions due to mismatch is minimized.

Figure 6:
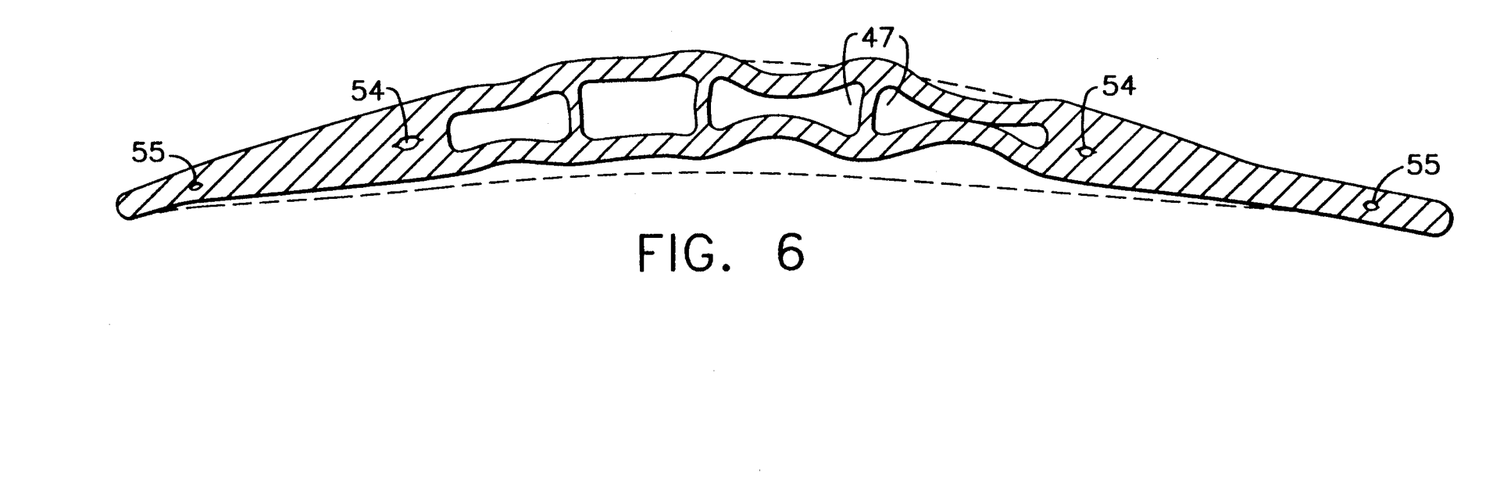
FIG. 6 is a side view, in section, of the airfoil blank of FIG. 4 after diffusion bonding for two hours.
Figure 7:
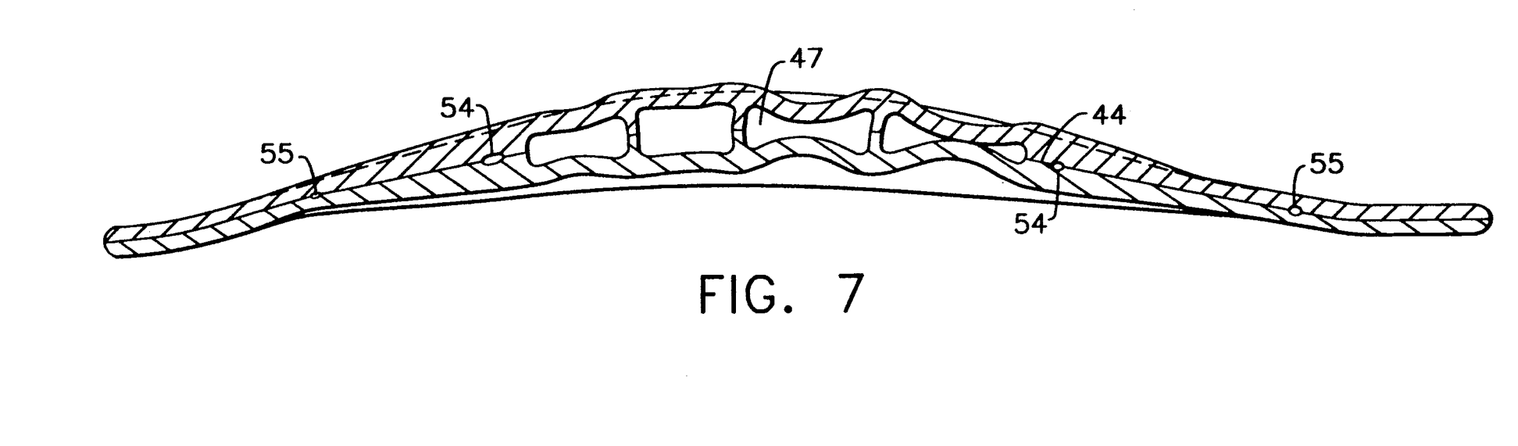
FIG. 7 is a side view, in section, of the airfoil blank of FIG. 4 after completion of diffusion bonding.

During the diffusion bonding process, the relatively low pressure at high temperature eventually causes the cavities 47 and depressions 50 to partially collapse. After about two hours at temperature, the airfoil resembles FIG. 6. Cavities 47 have become distorted and depressions 50, visible in FIG. 4, are no longer evident. However, voids 54, 55 now appear in the area which was previously part of the depressions near the gaskets. At the completion of the diffusion bonding process, typically after about 3 hours, the airfoil blank resembles FIG. 7. The amount of time will vary, however, depending on temperature and pressure. However, for the preferred temperatures and pressures, the minimum time for Ti-6Al-4V and Alloy 550 to diffusion bond is two hours. There is further distortion of the cavities, although voids 54, 55 still remain because of lower stresses in the regions between the gaskets. The dashed lines in both FIGS. 6 and FIGS. 7 represent the original configuration of the assembled airfoil halves before diffusion bonding.

The voids 54 represent small areas of disbond and must be removed. Failure to remove them could shorten the fatigue life of the part. Their removal is accomplished by hot isostatically pressing (HIP'ing) the part, FIG. 2, block 32. This is accomplished by placing the part in the furnace, if it has been removed, and while maintaining an equalized pressure between the airfoil blank exterior and the interior cavities, increasing the pressure to that used for hot isostatic pressing ("HIP"), 5,000 to 15,000 psi, and maintaining this pressure while the temperature is raised to the superplastic range for the airfoil material. For Ti-6Al-4V and Alloy 550, this temperature is preferably in the range of about 1700°-1750° F. for at least one hour, and preferably for about two to four hours. At the end of this time period, substantially all voids 54 have been removed and the HIP operation may be discontinued.

Figure 8:
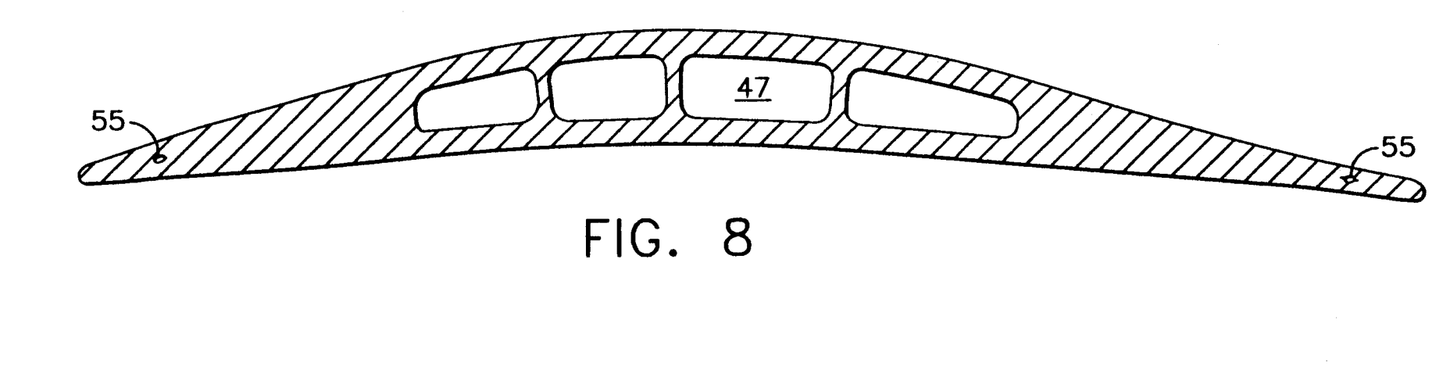
FIG. 8 is a side view, in section, of the airfoil blank of FIG. 7 after reinflation following diffusion bonding.
Figure 9:
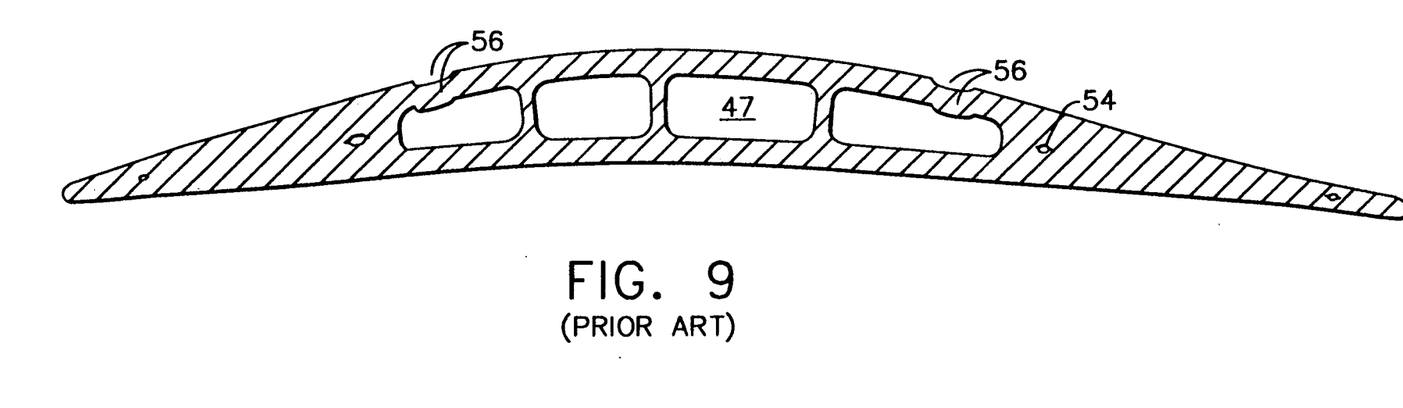
FIG. 9 is a side view in section, of a finished prior art airfoil showing the common prior art defect, surface grooving.

Before HIP, the seal over channel 52 is typically opened to equalize the gas pressure on both sides of the cavity walls, thereby preventing further collapse or distortion of the cavity walls. After completion of the HIP, the cavities are reinflated with a gas pressure sufficient to substantially restore the original cavity dimensions, without causing the cavities to bulge, FIG. 2, block 33. However, bulging cannot be controlled solely by gas pressure. Thus, airfoil designs in which bulging is a problem may be reinflated in an optional hot die. Any remaining voids 55 are unaffected by the reinflation since they were isolated from the cavities 47 by bonding of gaskets 40, 44, during diffusion bonding. Such an airfoil blank is depicted in FIG. 8. The airfoil blank is free of common defects such as surface grooving 56, which can affect the life and performance of the airfoils, typical of prior art hollow airfoils as shown in FIG. 9.

The airfoil is then machined from the airfoil blank by removing unnecessary regions of the periphery from the airfoil blank which may contain remaining voids 55, FIG. 8 and FIG. 2, block 34. No additional machining is required, since the reinflation, FIG. 2, block 33, returns the airfoil blank to substantially the same shape of the blank after joining and prior to diffusion bonding. If some slight dimensional deviation is present in the airfoil, it may be corrected by placing the airfoil in a die having the final airfoil configuration. The airfoil and die assembly are heated while pressure is applied. The airfoil then has the exact required configuration. This die forming operation differs from the prior art die forming operations, the prior art requiring substantial deformation in the dies, in that only slight corrections are required to the finished airfoil by the present invention so that die wear is minimal, and die replacement is not a problem.

Having described the presently preferred embodiments of our invention, it is to be understood that it may otherwise be embodied within the scope of the appended claims.

We claim:

1. A method for manufacturing a hollow airfoil, comprising the steps of:
   providing a pair of engineering alloy members capable of being joined by diffusion bonding and having a controlled grain size, which behave superplastically at elevated temperatures;
   forming from a first alloy member a convex member having a first interior side, a first exterior side and a mean camber and twist;
   forming from a second alloy member a concave member having a second interior side, a second exterior side and a mean camber and twist;
   machining the exterior side of the convex member and the concave member to near final twist and camber, forming a convex airfoil half and a concave airfoil half;
   machining the interior side of each airfoil half to form a sequence of cavities and ribs, the cavities and ribs of the convex and concave airfoil halves being opposed upon assembly of the halves together;
   cleaning the airfoil halves;
   assembling the convex and concave airfoil halves together so that the first interior side and the second interior side form an intermediate structure having opposed ribs in contact with each other, and opposed cavities defining a sequence of intermediate cavity shapes;
   welding the periphery of the assembled airfoil halves together;
   drawing a vacuum on the sequence of opposed cavities and then forming a vacuum seal while maintaining the vacuum;
   diffusion bonding the airfoil halves at a first preselected temperature and pressure for a first preselected time to form a bonded airfoil blank having a periphery;
   breaking the vacuum seal and equalizing the internal gas pressure in the sequence of cavities with the external gas pressure;
   hot isostatic pressing the bonded airfoil blank at a second preselected temperature in the superplastic temperature range of the alloy members and pressure for a second preselected time to remove internal defects; and
   applying an internal pressure to the airfoil blank sufficient to restore the internal cavity sequence to its shape prior to drawing the vacuum; and
   machining the periphery of the airfoil blank to obtain a finished airfoil.

2. The method of claim 1 further including the step of machining a gasket on at least an outer perimeter of the airfoil halves.

3. The method of claim 1 wherein the engineering alloy members are a pair of titanium-base alloy plates.

4. The method of claim 3 wherein the plates are formed by hot forming.

5. The method of claim 1 wherein the engineering alloy members are a pair of titanium-base alloy forgings and wherein the forming step is forging to near net final dimensions.

6. The method of claim 1 further including a step of machining a gasket around a perimeter of the sequence of cavities and ribs of each airfoil half.

7. The method of claim 1 wherein the engineering alloy members are selected form the group consisting of Ti-6Al-4V and Titanium Alloy 550.

8. The method of claim 7 wherein the step of diffusion bonding is performed at a temperature of at least 1675° F.

9. The method of claim 8 wherein the step of diffusion bonding is performed at a temperature in the range 1700°-1725° F.

10. The method of claim 1 wherein diffusion bonding is performed at a temperature sufficient for diffusion bonding of the alloy members.

11. The method of claim 1 wherein diffusion bonding is performed at a pressure of at least 15 psia.

12. The method of claim 11 wherein diffusion bonding is performed at a pressure between 15-50 psia.

13. The method of claim 11 wherein diffusion bonding is performed for a period of time of at least 2 hours.

14. The method of claim 1 wherein diffusion bonding is performed for a time sufficient to bond the alloy members.

15. The method of claim 1 wherein the vacuum drawn on the sequence of opposed cavities is a vacuum of at least $10^{-2}$ torr.

16. The method of claim 15 wherein the vacuum drawn on the sequence of opposed cavities is a vacuum of $10^{-3}$ to $10^{-5}$ torr.

17. The method of claim 1 wherein the airfoil blank is hot isostatically pressed by heating the airfoil blank to a temperature in its superplastic temperature range.

18. The method of claim 17 wherein the airfoil blank is Ti-6Al-4V and the superplastic temperature range is at least 1700° F.

19. The method of claim 17 wherein the blank is hot isostatically pressed at a pressure of at least 5000 psi.

20. The method of claim 19 wherein the blank is hot isostatically pressed at a pressure in the range of 5000–15000 psi.

21. The method of claim 1 further including a step, after the step of hot isostatically pressing, of inserting the airfoil in a die and heating the airfoil and die to an elevated temperature while applying pressure.

22. An airfoil formed by the process of claim 1.

* * * * *